3,557,268
EXTRUSION OF PLASTIC NETTING
Paolo Beretta and Mario Beretta, Cremella, Italy, assignors to Netlon International Limited, Blackburn, Lancashire, England
Filed Feb. 17, 1969, Ser. No. 799,594
Claims priority, application Great Britain, Feb. 23, 1968, 8,977/68
Int. Cl. B29c 17/14; B29d 7/04
U.S. Cl. 264—145                                    5 Claims

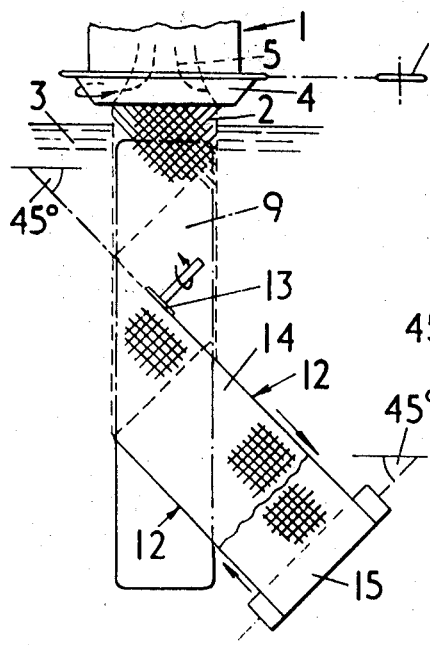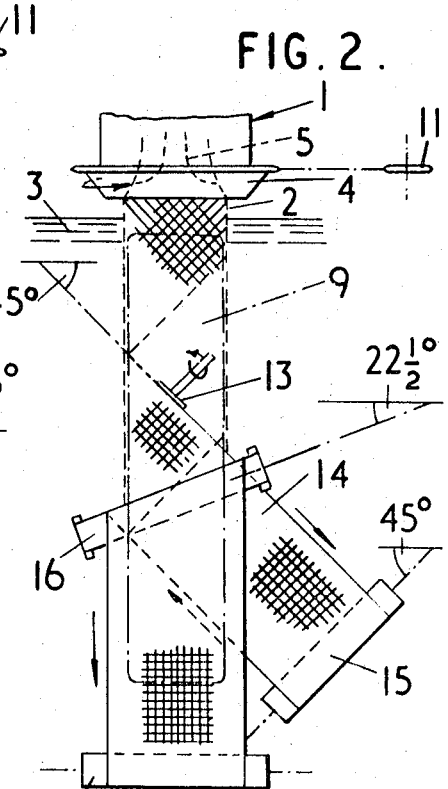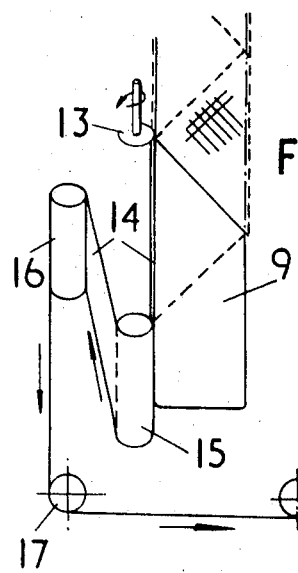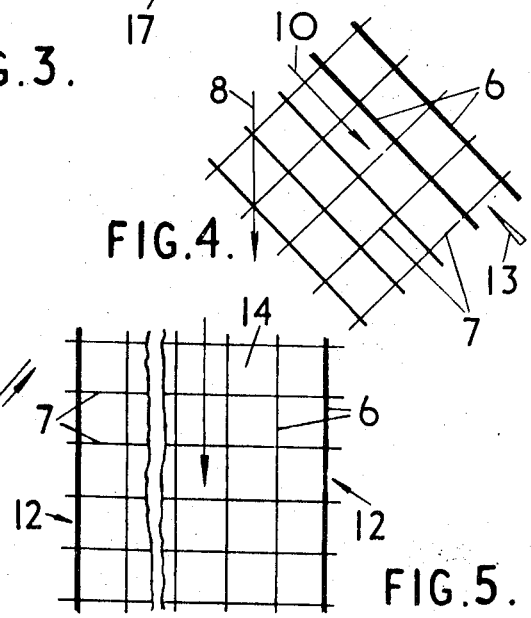
FIG.1. FIG.2. FIG.3. FIG.4. FIG.5.
INVENTORS
PAOLO BERETTA ET AL
ATTORNEYS United States Patent Office 3,557,268
Patented Jan. 19, 1971

ABSTRACT OF THE DISCLOSURE

A method of producing a continuous strip or sheet of thermoplastic net, in which one set of strands extends parallel to the strip or sheet edges and the other set lines transversely thereto, from an extruded tubular net in which neither of the sets of strands are parallel to the direction of extrusion, comprising extruding the net strands and net intersections from relatively rotating inner and outer circular concentric die members each having a series of circumferentially spaced die orifices therein, cooling the extruded tubular net, receiving the net tube on a mandrel of circular section, causing the net tube as it advances to rotate about the axis of the mandrel such that any strand of one set of strands follows a fixed helical path over the mandrel surface, slitting the net tube by cutter means between a pair of adjacent strands of said latter set of strands and hauling off the strip or sheet of net so formed in a direction tangential to the surface of the mandrel and inclined to the axis of the mandrel in line with the said helical path.

---

This invention relates to the extrusion of integral thermoplastice netting.

It is an object of the present invention to produce a continuous strip or sheet of extruded thermoplastic net in which one set of strands extends parallel to the strip or sheet edges and the other set lies transversely, preferably at right angles, thereto.

It is a further object of the present invention to provide a method and apparatus enabling an extruded tube of integral thermoplastic net, in which the two sets of strands lie across one another but in which neither set of strands extends parallel to the tube axis, to be helically slit along the line of one of the sets of strands, as soon as the thermoplastic is "set" after extrusion, directly from the extrusion head and to be taken therefrom as a flat strip or sheet in which one set of strands is parallel to the sheet or strip edges and the other set lies transversely, preferably at right angles, thereto.

The preferred net structure to which this present invention relates is what has been termed "square mesh" in which two sets of strands cross each other at substantially 90° to define net mesh openings which are rectangular but which, on extrusion, are defined by strands, none of which is parallel to the direction of extrusion.

By "90°," "square" and "rectangular" is meant within about ±5° thereof, since the net can be subsequently manipulated to have substantially 90° mesh openings.

Such nets have been made heretofore, for example, with apparatus such as shown in British Pat. No. 836,555 using circular concentric dies having extrusion orifices therein in the form of slots or bores, by counter-rotating the inner and outer dies at substantially the same speed to lay the two sets of strands in opposite helices at substantially 90° to each other around the tubular net product. Therefore, as extrusion proceeds, any point on each strand moves only in a direction parallel to the tube axis.

If it is desired, as is frequently the case, to slit the net tube to produce a flat strip or sheet in which one set of strands lies parallel to the sheet edges and the other set is substantially at right angles thereto, the net tube must be cut or slit on a helix between two adjacent strands of one set of strands. This involves rotation of the net tube about its axis in contact with a fixed cutter or like means, and heretofore this could only be done by dissociating the net tube from the extrusion dies, i.e. by forming a roll of tubular net, cutting it off at suitable intervals, and transferring the roll of net to a device for rotationally feeding the net tube against the cutter so as to helically slit the tube. Therefore, a continuous strip or sheet of "square mesh" netting could not be taken direct from the extrusion dies.

The invention consists in a method of producing a continuous strip or sheet of thermoplastic net, in which one set of strands extends parallel to the strip or sheet edges and the other set lies transversely thereto, from an extruded tubular net in which neither of the sets of strands are parallel to the direction of extrusion, comprising extruding the net strands and net intersections from relatively rotating inner and outer circular concentric die members each having a series of circumferentially spaced die orifices therein, cooling the extruded tubular net and receiving the net tube on a mandrel of circular section, causing the net tube as it advances to rotate about the axis of the mandrel such that any strand of one set of strands follows a fixed helical path over the mandrel surface, slitting the net tube by cutter means between a pair of adjacent strands of said latter set of strands and hauling off the strip or sheet of net so formed in a direction tangential to the surface of the mandrel and inclined to the axis of the mandrel in line with the said helical path.

The invention further consists in a method of producing a continuous strip or sheet of extruded thermoplastic net according to the preceding paragraph, wherein one of the die members is stationary and the strands from the stationary die member are caused to take said helical path over the mandrel by the inclined haul-off of the slit net strip or sheet, the net tube having been slit between adjacent strands originating from the stationary die member.

It will be appreciated that in the process according to the present invention, the net tube does not advance only axially, but also rotationally, of the mandrel so that one set of strands follows a fixed helical path to enable slitting of the tube by a spatially fixed cutter between an adjacent pair of strands to take place on the mandrel. This is, in effect, what happened when net tube was helically slit heretofore in a separate operation in finite rolled lengths, but the present invention enables continuous net strip or sheet to be taken direct from the extruder which is particularly desirable for subsequent "in line" treatment of the net, e.g. bi-axial orientation of the net by stretching both longitudinally and transversely of the net strip.

The angle at which the two sets of strands cross each other, where the set of strands from the stationary die member follows a given helical path over the mandrel, is governed by the speed of rotation of the other die member (which will rotate in the same direction as the "hand" of the helix along which the other strands pass). Thus, any desired angle may accurately be obtained, including the preferred right angle, by adjustment of the speed of the rotating die.

The transverse width of the continuous strip or sheet severed from the extruded net tube will, within practical limits, be decided by the helix angle which the strands from the stationary die member are caused to assume over the mandrel, the greater the helix angle the greater the width of the strip or sheet.

If desired, an adjacent pair of die orifices on the stationary die member can be larger than the other die orifices therein to provide enlarged strands between which the slitting can take place, thus providing a heavier selvedge along each edge of the net strip.

The spacing of the die orifices on either die member as well as their shape and size may be pre-selected according to the product required.

In a preferred form of the invention for the production of "square mesh" (i.e. 90°) net in continuous strip or sheet, the helix angle for the strands from the stationary die member is 45° and the rotating die member rotates at twice the speed that either of the die members counter-rotate in conventional "square mesh" net production using counter-rotating dies.

The net tube is slit, as described above, between a pair of strands from the stationary die, preferably by moving cutter means such as a circular saw or blade.

The net strip or sheet so produced is led off from the mandrel surface around a roller disposed at 45° to the mandrel axis to one side of the mandrel and may thence pass to a stationary bar disposed at an angle of 22½° to the mandrel axis and above the level of the first roller from which the strip passes to a second roller at right angles to the axis of the mandrel and below or away from the mandrel so that the net strip can be led off along the normal centre line of production of the extrusion head. Alternatively, the net strip or sheet can be lead off direct from the 45° roller.

Either the inner member or the outer die member may be the stationary die member, however the construction of the extrusion head, particularly as regards bearings, can be greatly simplified, compared with extrusion heads in which the inner and outer die members counter-rotate, if the outer die member is the stationary member and only the inner die rotates.

In the accompanying drawings:

FIG. 1 is a diagrammatic front elevation of the integral net extrusion apparatus according to the present invention, FIGS. 2 and 3 are respectively diagrammatic front and side elevations of a modification of the apparatus shown in FIG. 1.

FIGS. 4 and 5 are diagrams of the integral net on an enlarged scale,

Figure 6:
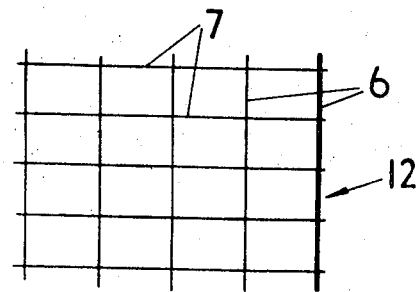
FIGS. 6 and 7 are diagrams of modified integral net forms.

In carrying the invention into effect according to one mode by way of example an integral thermoplastic net extrusion head indicated at 1 extrudes a net tube 2 downwardly into a water bath 3. The extrusion head is basically as described in British Pat. No. 836,555 and comprises a pair of circular co-axial die members capable of being relatively rotated about their common axis, each die member being formed with a plurality of net strand extrusion slots or ducts around their adjacent peripheries, whereby as the slots or ducts in each die member pass one another net intersections are produced in a manner which is now well known. In FIGS. 1 and 2 of the drawings, the outer die is indicated by 4 and the inner die (dotted) by 5.

The net tube 2 so produced has two sets of strands 6 and 7 (FIG. 4) laid in opposite helices at substantially 90° to each other and at 45° to the axis of extrusion 8.

The extruded net tube 2 after passing into the water bath 3 is received on a circular mandrel 9 down which it passes in the direction of extrusion 8.

According to the present invention, however, the net tube 2 is caused to move around the mandrel 9 at the same time as it moves axially of the mandrel in the direction of the arrow 8, so that the strands 6 all follow fixed helical paths parallel to the arrow 10 in FIG. 4. In the present example the angle of the helical paths is 45° to the mandrel axis.

In order to make it possible that each of the strands 6 follow their individual fixed helical paths over the mandrel 9 for the reason explained hereinafter, the die member from which the strands 6 are extruded is fixed (i.e. non-rotating) and in the example illustrated in FIGS. 1 and 2, it is the inner die 5 which is fixed and the outer die 4 which is rotated by means of a drive indicated at 11. In practice, however, it will be more convenient to reverse this arrangement and hold the outer die 4 fixed and rotate only the inner die 5 since this will allow the design of the extrusion head, particularly as regards bearings, to be greatly simplified.

Since the net strands 6 from the fixed die member 5 each follow fixed individual helical paths, the other (outer) die member 4 must be rotated at a speed which causes it to lay its extruded strands 7 (FIG. 4) at 90° to the strands 6. Thus the outer die 4 is rotated at twice the speed that either of the die members counter-rotate in a conventional extrusion process of this type using counter-rotating dies for the production of "square mesh" net.

The purpose of the present invention is to produce, straight from the extruder, a continuous strip or sheet of extruded net in which one set of strands 6 lie parallel to the strip or sheet edges 12 and the other set of strands 7 lie transversely at right angles thereto. To this end a spatially fixed cutter 13, conveniently in the form of a driven circular saw or blade, is located adjacent the surface of the mandrel 9, the periphery of the blade passing through a slot (not shown) in the mandrel surface, the plane of the blade being parallel to the helical path of the net strands 6, see FIG. 4 where the blade is shown diagrammatically by a blade 13. Since the blade 13 is spatially fixed, the strands 6 must each follow their own individual fixed helical paths parallel to the arrow 10 (FIG. 4) so that the same pair of strands 6 always pass on either side of the blade 13 which severs the transverse strands 7 between the pair of strands 6 to convert the net tube into the net strip or sheet 14 (FIGS. 1 and 2) to which traction can be applied by haul-off means in known manner.

After the net strip or sheet 14 has been severed out of the net tube 2, it is drawn off tangentially to the mandrel 9 (FIG. 3) at the helix angle (45°) at which the strands 6 lie. This drawing-off is effected in known manner by a pair of driven haul-off rollers (not shown) and it is the traction applied thereby to the net strip or sheet 14 which causes the strands 6 issuing from the fixed die member 5 to assume their helical path around the mandrel 9. For starting-up, the net tube must be manually hauled down and caused to rotate about the mandrel 9 until the severing of the net strip or sheet 14 is established and proper traction thereof effected.

The net strip or sheet 14 is led off round a free running roller 15 set at 45° to the mandrel axis (or the horizontal), where the helix angle is 45° (see hereinafter) and may be hauled off direct from there (FIG. 1). Alternatively (see FIGS. 2 and 3), the net strip or sheet 14 may pass from the roller 15 around a fixed bar 16 set (in the present case) at 22½° to the horizontal and opposite the mandrel and thence to a roller 17 below and under the mandrel so that the line of delivery of the net strip or sheet is in line with the normal delivery line of the extrusion head. The strip or sheet can then be led out of the water bath by such other roller means 18 as may be necessary.

If it is desired to form a selvedge along the side edges of the strip or sheet 4, an adjacent pair of die slots or ducts in the fixed die member 5 may be enlarged to extrude thicker strands as shown in FIGS. 4 and 5, the extruder head being manipulated and adjusted so that the pair of enlarged strands 6 pass either side of the cutter 13.

Figure 7:
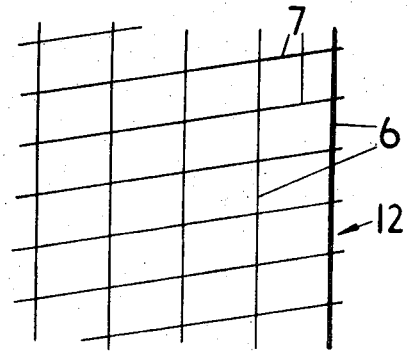

While there has been described above the production of a "square mesh" product in which the meshes are equal sided squares, the meshes may be rectangular as shown in FIG. 6 by suitable spacing of the die slots or ducts or the meshes need not be square or rectangular but may be parallelogrammatic (FIG. 7) by adjusting the speed of rotation of the moving die member.

Figures 8, 9, 10:
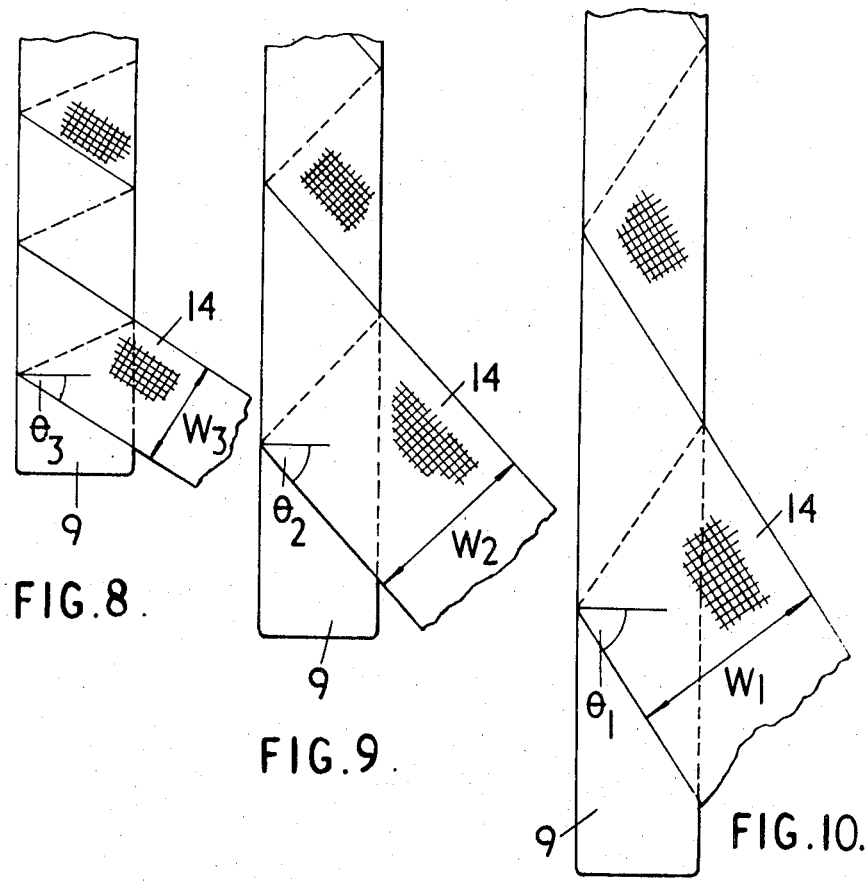
FIGS. 8, 9 and 10 are diagrams showing a method of operating the apparatus according to the present invention to achieve varied net strip or sheet widths.

The transverse width of the net strip or sheet 14 is, within practical limits, decided by the helix angle which the strands from the fixed die member are caused to assume over the mandrel 9, the greater the helix angle the greater the width of the strip or sheet 14. Thus, see FIGS. 8, 9 and 10, the helix angle $\theta_1 > \theta_2 > \theta_3$ and consequently the width of the strip or sheet is as $W_1 > W_2 > W_3$.

We claim:

1. A method of producing a continuous strip or sheet of thermoplastic net, in which one set of strands extends parallel to the strip or sheet edges and the other set lies transversely thereto, from an extruded tubular net in which neither of the sets of strands is parallel to the direction of extrusion, comprising extruding the net strands and net intersections from relatively rotating inner and outer circular concentric die members each having a series of circumferentially spaced die orifices therein, cooling the extruded tubular net, receiving the net tube on a mandrel of circular section, causing the net tube as it advances to rotate about the axis of the mandrel such that any strand of one set of strands follows a fixed helical path over the mandrel surface, slitting the net tube by cutter means between a pair of adjacent strands of said latter set of strands and hauling off the strip or sheet of net so formed in a direction tangential to the surface of the mandrel and inclined to the axis of the mandrel in line with the said helical path.

2. A method of producing a continuous strip or sheet of extruded thermoplastic net according to claim 1, wherein one of the die members is stationary and the strands from the stationary die member are caused to take said helical path over the mandrel by the inclined haul-off of the slit net strip or sheet, the net tube having been slit between adjacent strands originating from the stationary die member.

3. Apparatus for producing a continuous strip or sheet of thermoplastic net in which one set of strands extends parallel to the strip or sheet edges and the other set lies transversely thereto, from an extruded tubular net in which neither of the sets of strands is parallel to the direction of extrusion, comprising an extruder head having relatively rotating circular concentric die members each having a series of circumferentially spaced die orifices therein, a circular mandrel located co-axially below said die members, cooling means located at or about the level of the top of the mandrel, means for rotating only one of the circular die members, the other being stationary, cutter means adjacent the mandrel surface and spaced a distance below the top of the mandrel, said cutter means being in a plane inclined to the axis of said mandrel, and means for drawing down and hauling-off the net tube so produced so that each strand extruded from the stationary die member follows a fixed helical path parallel to the plane of said cutter means over the mandrel surface whereby an adjacent pair of strands extruded from the stationary die member can pass either side of the cutter means which thereby severs from the extruded net tube a continuous strip of net.

4. Apparatus as claimed in claim 3 wherein said drawing down and hauling-off means includes a roller means located at one side of the mandrel axis and set at an angle at right angles to the helical path of the strands extruded from the stationary die member around which the severed net strip is passed so that the net strip is drawn off tangentially from the mandrel surface and along the axis of the helical path.

5. Apparatus as claimed in claim 4 wherein the net strip after passing around the roller means passes around a further turning point means so that the resultant net tube is directed to pass below or away from the lower end of the mandrel and thence back on to the original line of extrusion.

References Cited

UNITED STATES PATENTS

| | | | |
|---|---|---|---|
| 2,566,846 | 9/1951 | Martin | 18—13(R) |
| 2,919,467 | 1/1960 | Mercer | 264—167X |
| 2,943,356 | 7/1960 | Rasmussen | 264—146X |
| 3,281,897 | 11/1966 | Mercer | 264—209X |
| 3,291,879 | 12/1966 | Martin | 264—167 |
| 3,384,530 | 5/1968 | Mercer et al. | 264—167 |
| 3,384,692 | 5/1968 | Galt et al. | 264—167 |

ROBERT F. WHITE, Primary Examiner

A. M. SOKAL, Assistant Examiner

U.S. Cl. X.R.

264—146, 167; 18—12